(12) United States Patent
Westberg

(10) Patent No.: US 9,014,142 B2
(45) Date of Patent: Apr. 21, 2015

(54) CELLULAR NETWORK MOBILITY

(75) Inventor: Lars Westberg, Enköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 19 days.

(21) Appl. No.: 14/007,555

(22) PCT Filed: Mar. 31, 2011

(86) PCT No.: PCT/EP2011/054978
§ 371 (c)(1),
(2), (4) Date: Sep. 25, 2013

(87) PCT Pub. No.: WO2012/130308
PCT Pub. Date: Oct. 4, 2012

(65) Prior Publication Data
US 2014/0023042 A1     Jan. 23, 2014

(51) Int. Cl.
*H04W 4/00*    (2009.01)
*H04W 36/00*    (2009.01)

(52) U.S. Cl.
CPC ...... *H04W 36/0016* (2013.01); *H04W 36/0011* (2013.01)

(58) Field of Classification Search
None
See application file for complete search history.

(56) References Cited

U.S. PATENT DOCUMENTS 7,532,596 B2 * 5/2009 Trossen et al. ............ 370/331
8,489,096 B2 * 7/2013 Rasanen .................. 455/436

(Continued)

FOREIGN PATENT DOCUMENTS

WO    2010121191 A1    10/2010

OTHER PUBLICATIONS

3rd Generation Partnership Project. "Technical Specification Group Services and System Aspects; Multi access PDN connectivity and IP flow mobility." Mar. 2009. Release 9. 3GPP TR 23.861 V1.0.0.

*Primary Examiner* — Clemence Han
(74) *Attorney, Agent, or Firm* — Murphy, Bilak & Homiller, PLLC

(57) ABSTRACT

A method of providing for the transfer of an IP flow when a client is handed over from a first to a second radio layer node of a cellular communications network. The method comprises establishing said IP flow between a client and an application of a local service network within or connected to said first radio layer node, and sending said IP flow over a radio access bearer extending between the client and the first radio layer node, and maintaining within a mobility database a mapping between an identifier of the client, an IP address of said application, and an IP address of said local service network. Prior to or upon handover of the client from said first radio layer node to the second radio layer node, a request including the client identifier is sent from said second to said first radio layer node or to another node if the central mobility database is maintained in that other node. The client identifier contained in said request is used at said first radio layer node or said other node to identify said mapping in the mobility database, and the application and local service network IP addresses are sent from said first radio layer node or said other node, to said second radio layer node. The application and local service network IP addresses are received at said second radio layer node, and the received local service network IP address are used at said second radio layer node to establish a tunnel between the second radio layer node and said local service network. Said IP flow is switched from said radio access bearer to said tunnel for delivery to the client via said second radio layer node.

21 Claims, 10 Drawing Sheets

(56) References Cited

U.S. PATENT DOCUMENTS

| | | | |
|---|---|---|---|
| 8,879,504 B2 * | 11/2014 | Ng et al. | 370/331 |
| 2006/0129630 A1 | 6/2006 | Catalina-Gallego et al. | |
| 2010/0284370 A1 * | 11/2010 | Samar et al. | 370/331 |
| 2010/0290465 A1 | 11/2010 | Ankaiah et al. | |
| 2014/0219242 A1 * | 8/2014 | Perras et al. | 370/331 |

* cited by examiner

CELLULAR NETWORK MOBILITY

TECHNICAL FIELD

The present invention relates to cellular network mobility, and in particular to facilitating mobility in the case where local service networks within a given cellular network operator domain utilise overlapping IP addresses.

BACKGROUND

In 3G cellular communication architectures, data services are provided to subscribers using the General Packet Radio Service (GPRS). A GPRS core network routes data between a UMTS Terrestrial Radio Access Network, UTRAN, to which a client (User Equipment or UE) is attached, and an IP backbone of the network operator. A so-called GPRS Gateway Support Node (GGSN) provides an interconnection between the GPRS core network and the IP backbone. The IP backbone provides client access to "internal" packet services of the network operator as well as access to the Internet and the various "external" services available over the Internet. The interface between the GGSN and the IP backbone is referred to in the relevant standards as the Gi interface. In the case of SAE/LTE network architectures, that is the so-called 4G networks, the Packet Data Network Gateway (PDN Gateway) within the Evolved Packet Core (EPC) network performs a role broadly similar to that of the GGSN, connecting the EPC to the operator's IP backbone.

Network operators are currently experiencing rapid growth in demand for data services, due in large part to the growing use of streaming media services. These services tend to be centralised "above" the GGSN/PDN Gateway anchor point in the sense that subscribers connect to common servers (hosting the services) regardless of geographical location. In order to reduce the burden placed on networks by this increased demand, it is desirable to allow for the local breakout of data connections such that data traffic does not have to flow unnecessarily through mobility tunnels, e.g. via a subscriber's home network to a visited network. It is further desirable to introduce where possible local data sources, i.e. local streaming servers and local caching, to reduce the path length between data source and subscriber. Such local data sources are enabled by so-called local "service networks" located beneath the level of the GGSN/PDN Gateway, for example within or co-located with a radio layer node.

FIG. 1 illustrates schematically an example streaming media architecture with deployed caches used to offload the central server. The caches may be located within the Internet, within the IP backbone network, and/or within the operator's network. Considering the latter, in the case of a 3G network, caches could be located within the GPRS core network, for example co-located with or connected to the GGSN, or could be located within the RAN, for example co-located or connected to the Radio Network Controller (RNC). Similarly, in the case of a 4G network, caches may be located in the packet core network (co-located with or coupled to the PDN Gateway) or within the radio access network (co-located with or coupled to the enhanced Node B (eNB)).

Caching data beneath the GGSN/PDN Gateway attachment point, whilst efficient in terms of reducing network traffic, does raise issues regarding subscriber mobility. Subscriber mobility is a requirement for the introduction and acceptance of any data traffic handling solution. Operators and subscribers will not accept a solution which results in the loss of service connections when a subscriber moves from one location to another or is otherwise handed over between network access points. There is an inherent conflict between moving the cache as close as possible to the subscriber equipment in order to reduce network traffic on the one hand, and facilitating subscriber mobility on the other. This applies of course not only to data caches but also to other data sources.

One possible mechanism for enabling the provision of data to mobile nodes from local service networks located within or associated with the radio layer node (e.g. the RNC or and eNB) involves providing the local service networks with unique IP addresses within the domain of a given network operator. One or more unique IP addresses may be allocated to each application residing in the local service network. Session establishment requests received over the local radio link are routed to an application within the local service network based upon the unique IP addresses, and are handled by the application based upon the destination Uniform Resource Locator (URL). By implementing classifiers and traffic selectors within the radio layer node, when a handover occurs it is possible to switch traffic (flowing between the application and the mobile node) from a radio link associated with the current or "source" radio layer node, to the new or "target" radio layer node via the operator's IP backbone network. Such a mechanism allows local service networks to be used where possible, but facilitates handover between radio layer nodes whilst maintaining a connection between the mobile node and the local application responsible for delivering the content.

This approach suffers from the disadvantage that a given application, e.g. responsible for delivering streaming video (TV) channels, will be allocated different IP addresses in different radio layer nodes. The handling of different IP addresses for the same application can prove difficult, e.g. DNS provisioning is complex given the need to map a given FQDN to multiple IP addresses in a location dependent manner. There are advantages to allowing common applications in different locations to be identified by the same IP address.

SUMMARY

It is an object of the present invention to allow the caching or sourcing of data within the radio access network such that subscribers can access that data whilst at the same time being allowed to switch radio layer nodes without loosing the connection to the application supplying the data. It is a further object of the invention to allow common applications in different locations to be identified by the same IP address.

According to a first aspect of the present invention there is provided a method of providing for the transfer of an IP flow when a client is handed over from a first to a second radio layer node of a cellular communications network. The method comprises establishing said IP flow between a client and an application of a local service network within or connected to said first radio layer node, and sending said IP flow over a radio access bearer extending between the client and the first radio layer node, and maintaining within a mobility database a mapping between an identifier of the client, an IP address of said application, and an IP address of said local service network. Prior to or upon handover of the client from said first radio layer node to the second radio layer node, a request including the client identifier is sent from said second to said first radio layer node or to another node if the central mobility database is maintained in that other node. The client identifier contained in said request is used at said first radio layer node or said other node to identify said mapping in the mobility database, and the application and local service network IP addresses are sent from said first radio layer node or said other node, to said second radio layer node. The application and local service network IP addresses are received at said second radio layer node, and the received local service network IP address are used at said second radio layer node to establish a tunnel between the second radio layer node and said local service network. Said IP flow is switched from said radio access bearer to said tunnel for delivery to the client via said second radio layer node.

According to a second aspect of the present invention there is provided an apparatus configured to operate as a radio layer node within a cellular communications network. The apparatus comprises an IP flow controller for controlling an IP flow between a client and an application of a local service network within or connected to the apparatus, and for sending said IP flow over a radio access bearer extending between the client and the first radio layer node. A database controller is provided for maintaining within a mobility database, a mapping between an identifier of the client, an IP address of said application, and an IP address of said local service network. The apparatus further comprises a mobility controller configured, prior to or upon handover of the client from the apparatus to a second radio layer node, to receive a request including the client identifier from said second radio layer node, to use the client identifier contained in said request to identify said mapping in the mobility database, and to send to said second radio layer node the application and local service network IP addresses. A tunnel configurator is provided for configuring an IP tunnel towards said second radio layer node, whilst a switch is provided for switching said IP flow from said radio access bearer to said tunnel for delivery to the client via said second radio layer node.

According to a third aspect of the present invention there is provided an apparatus configured to operate within a cellular communications network. The apparatus comprises a receiver for receiving from a first radio layer node a mapping between an identifier of a client associated with the radio layer node, an IP address of an application delivering an IP flow to said client, and an IP address of a local service network within which said application is located. A mobility database is provided for recording the received mapping, whilst a mobility controller is provided and configured, prior to or upon handover of the client from said first radio layer node to a second radio layer node, to receive a request including the client identifier from said second radio layer node, to use the client identifier contained in said request to identify said mapping in the mobility database, and to send to said second radio layer node the application and local service network IP addresses.

Embodiments of the present invention may allow IP addresses for data such as streaming media to be shared by different radio layer nodes in a cellular network. This greatly simplifies DNS management.

DETAILED DESCRIPTION

The above discussion recognises that, in the absence of an appropriate handover mechanism, locating a local service network (e.g. comprising one or more applications acting as data sources, e.g. data caches) at the level of the radio layer node, that is the RNC in the case of a 3G network and the eNB in the case of a 4G network (i.e. Long-Term Evolution, LTE), will effectively preclude the efficient handover of subscribers currently accessing the local service network. Existing data forwarding mechanisms (i.e. the Iur interface in 3G networks and the X2 interface in 4G networks) are not suitable for reliable and long term data forwarding. Whilst it is possible to overcome this problem by allocating unique IP addresses to a given local service network, this can in turn cause problems with address handling including FQDN resolution. In contrast, allocating common IP addresses to the same applications within different local service networks (associated with respective, different radio layer nodes) simplifies the address handling procedures.

The mobility solution proposed here involves the maintenance of a local mobility database at the radio layer node (i.e. local service network) level and which records, for mobile nodes accessing applications within a local service network over a local radio link, mappings between mobile node identities on the one hand and a local service network IP address on the other. This local service network IP address is an IP address that is unique at least within the network operator's domain and which can be used as a tunnel endpoint IP address. The local mobility database can be accessed, following a handover of the radio link, by the new (or "target") radio layer node in order to determine the tunnel endpoint IP address of the in-use local service network. Once the new radio layer node knows the tunnel endpoint IP address, a tunnel can be established between the in-use local service network and the new radio layer node, and existing IP flows can be routed through this tunnel.

Figure 1:
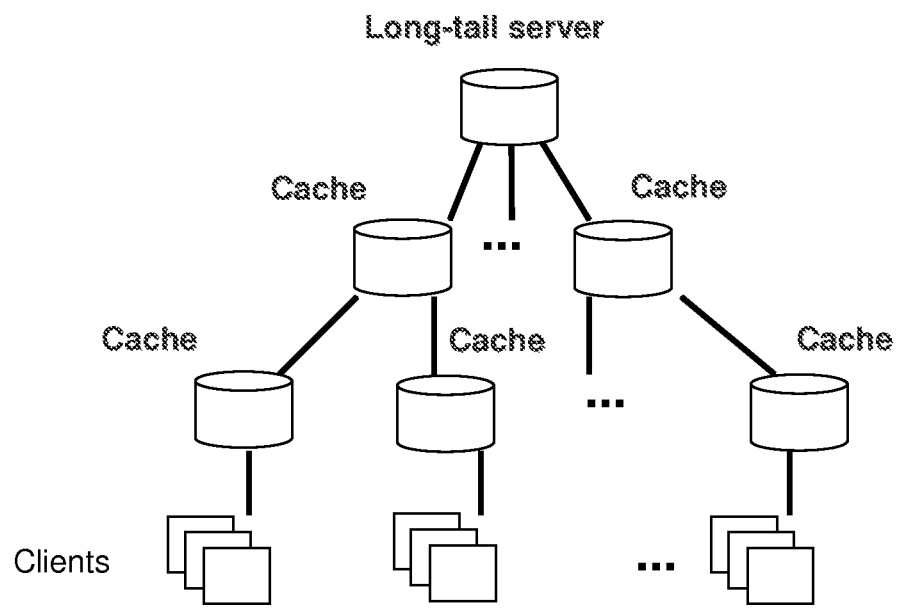
FIG. 1 illustrates schematically a data distribution network including caches located at various levels in the distribution network tree.
Figure 2:
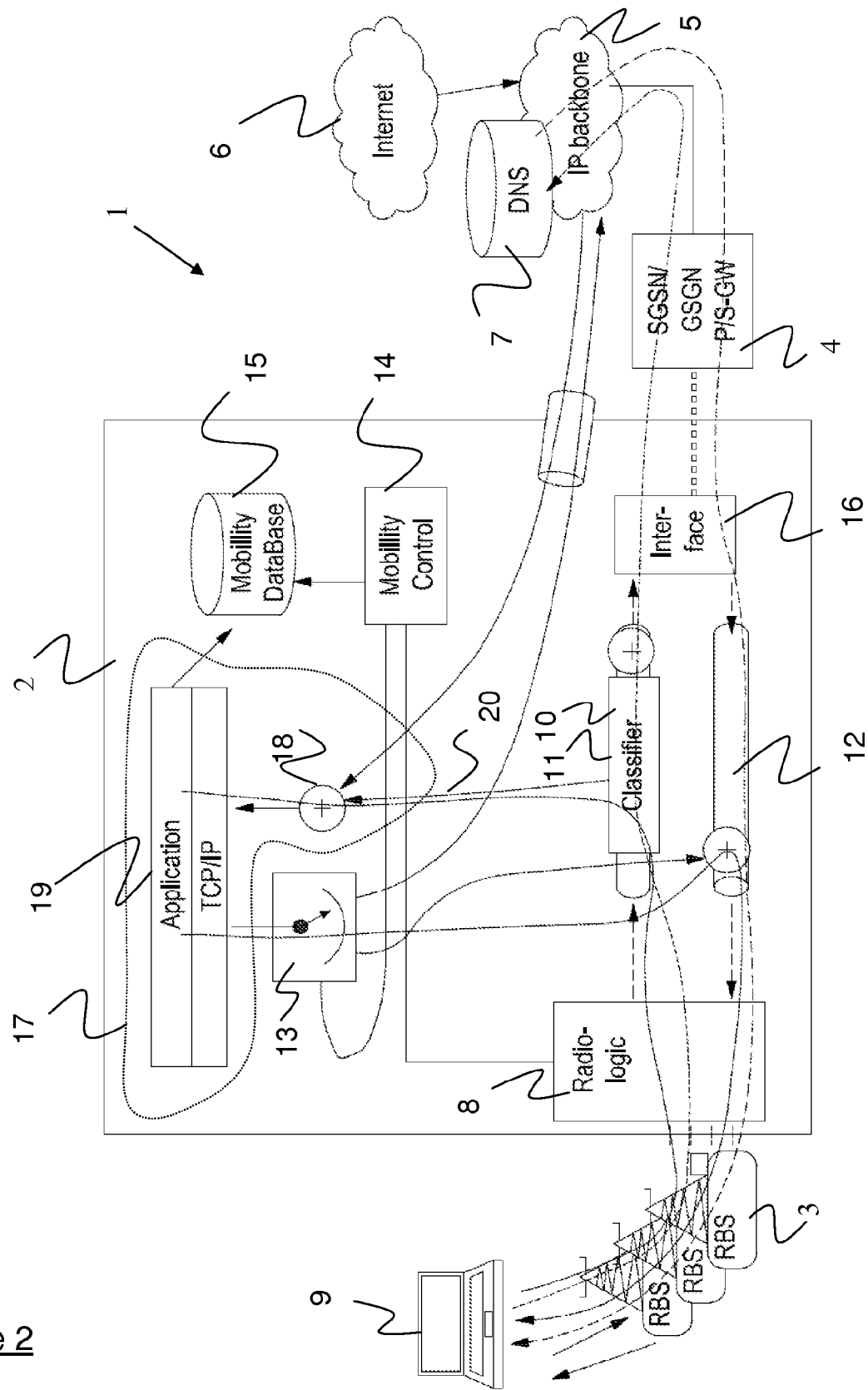
FIG. 2 illustrates schematically a 3G cellular network architecture including a Radio Network Controller implementing IP flow switching at handover.

FIG. 2 illustrates schematically a first aspect of this mobility solution in the context of a 3G network operated by a given network operator. This network forms part of an operator "domain" 1. Network components illustrated in FIG. 2 include an RNC 2 configured to control a plurality of Radio Base Stations (RBSs) 3. The network further comprises a General GPRS Support Node (GGSN) 4 that is located within a GPRS core network part of the operator's network. The GGSN 4 interconnects the GPRS core network to an IP backbone network 5 within the same operator domain. The IP backbone network is in turn connected to the Internet 6. Also illustrated in FIG. 2 is a Domain Name System (DNS) 7 which may comprise one or a plurality of DNS servers.

The RNC 2 comprises radio logic 8 (also referred to here as a "radio control unit") which is responsible for establishing and controlling radio links or Radio Access Bearers (RABs) as they are generally referred to. The RABs are used to send and receive data (and other) traffic to subscriber terminals (User Equipment or UEs according to 3G terminology). A single UE 9 is shown in FIG. 2 and is assumed to be currently communicating with the GPRS core network via an established Packet Data Protocol (PDP) context. This context is carried between the UE 9 and the RNC 2 over one or more RABs, via one of the plurality of RBSs 3. The 3G defined process for establishing PDP contexts and RABs will be well known to the person of skill in the art and will not be described further here. As well as performing the usual radio control functions, the radio logic 8 is configured to assist with the switching of traffic flows within the RNC 2.

The RNC 2 illustrated in FIG. 2 further comprises the following functional components:
- An uplink packet handler 10 including an IP packet classifier 11.
- A downlink packet handler 12.
- A IP packet route selector 13.
- A mobility control entity 14.
- A mobility database 15.
- An interface 16 connecting the RNC to the GPRS core network.

The RNC further comprises a local service network 17 which in turn comprises:
- A packet concentrator 18.
- One or more applications 19 (each with its own TCP/IP layer).

An application 19 implements logic for supplying data flows to clients (such as the UE 9). The application is assumed to maintain one or more data sources such as data caches. For example, a data source may cache streaming video. For the purpose of the present discussion, it is not relevant how the cache is filled. It will be appreciated that the functional elements described here can be implemented using a combination of software and data stored in a memory, and hardware such as processors.

It is assumed here that a client (UE) 9 has already established a PDP context with the GGSN 4, and that, as part of this process, it will have been allocated a client IP address (and will make use of a self-assigned client port number). In order to access a data source such as a source of streaming media, the UE 9 will send a DNS query containing a FQDN (identifying a service to be accessed) to the IP backbone network 5 via the established PDP context. The query will be routed to the DNS 7 which will (e.g. based on a configured A record) return an IP address mapped to the FQDN. As has already been discussed, that IP address is the same regardless of the current location of the UE 9 (that is regardless of the RNC to which the UE is attached). Considering further the packet classifier 11 of the uplink packet handler 10, the packet classifier 11 is configured to classify upstream packets based on one or more components of a five-tuple vector, that is IP address (source/destination), port (source/destination) and protocol. The classifier 11 allows IP packets with a predefined five-tuple vector to be routed to the local service network 17 and in particular to a specific application 19 within that network. [Only a single application is illustrated in FIG. 2. If more than one application is present in the local service network 17, the classifier 11 will either route to the correct application, or some routing function will be included in the local service network.] The classifier 11 is configured in particular to identify uplink traffic directed to the resolved IP address (returned to the UE by the DNS) and to route that traffic (shown in FIG. 2 using the line identified by reference numeral 20) to the application 19 via the packet concentrator 18.

The downlink packet handler 12 further comprises a packet insert function (marked with a "+" in the Figure) which allows insertion of packets received from the packet route selector 13.

The UE 9 starts a session with an application 19 within the local service network 17, for example by performing a TCP handshake (using the received IP address and a well known port number such as port 80) including sending an http GET message including the URL of the requested service. Signalling traffic is routed to the TCP/IP layer beneath the application 19 by the packet classifier 11 of the uplink packet handler 10. The application identifies the requested service based upon the URL and begins streaming media (e.g. from the data cache) to the UE 9 over the local radio link. [The position of selector 13 is set such that the local service network traffic provided by the application 19 is sent over the local link.] This system architecture allows a single application to deliver data from multiple caches, e.g. in order to make available multiple streaming television channels.

At the same time as setting the selector 13, the application 19 updates the mobility database 15 with certain anchoring information. The anchoring information or "state" information for the UE 9 is, in this example:
- Set_anchoring (Application_dest_IP, application_port, application_protocol, client_IP, client_port, client_protocol, Receiver_Tunnel_IP, Receiver_tunnel_Port, Receiver tunnel_protocol), where
- "Application_dest_IP"—The IP address of the in-use data source, i.e. it is the IP address used by the UE to access the data source (and returned to it in response to the DNS lookup).
- "application_port"—The port number of the in-use data source, e.g. 80.
- "application_protocol"—The used transport protocol number, e.g. TCP or UDP. This is a part of the IP-protocol header fields.
- "client_IP"—The IP address of the client, i.e. UE.
- "client_port"—The port number of the client, i.e. UE.
- "client_protocol"—The used transport protocol number, e.g. TCP or UDP. This is a part of the IP-protocol header fields.
- "Receiver_Tunnel_IP"—The IP address of the application, i.e. a unique IP address (within the operator's domain) that allows the application to be reached externally, i.e. over the IP backbone.
- "Receiver_tunnel_Port"—The port number of the application on which the application listens for externally originating traffic.
- "Receiver_tunnel_protocol"—an identification of the transport protocol used in the session, e.g. UDP or TCP.

In the event that the UE 9 establishes a further session with the local service network 17 and which has a different application destination IP address and/or port number, a further mapping will be added to the mobility database 15.

It is noted that whilst the mappings considered here use the client IP address (and port number) to identify the UE 9, other identities can alternatively be used, including the International Mobile Subscriber Identity (IMSI). The only requirement on the identity is that it should uniquely identify the client (at least within the operator's domain).

Consider now what happens when the UE 9 moves out of the range of the RBSs 3 controlled by the RNC 2 and moves into the range of a second RBS controlled by a second RNC.

Figure 3:
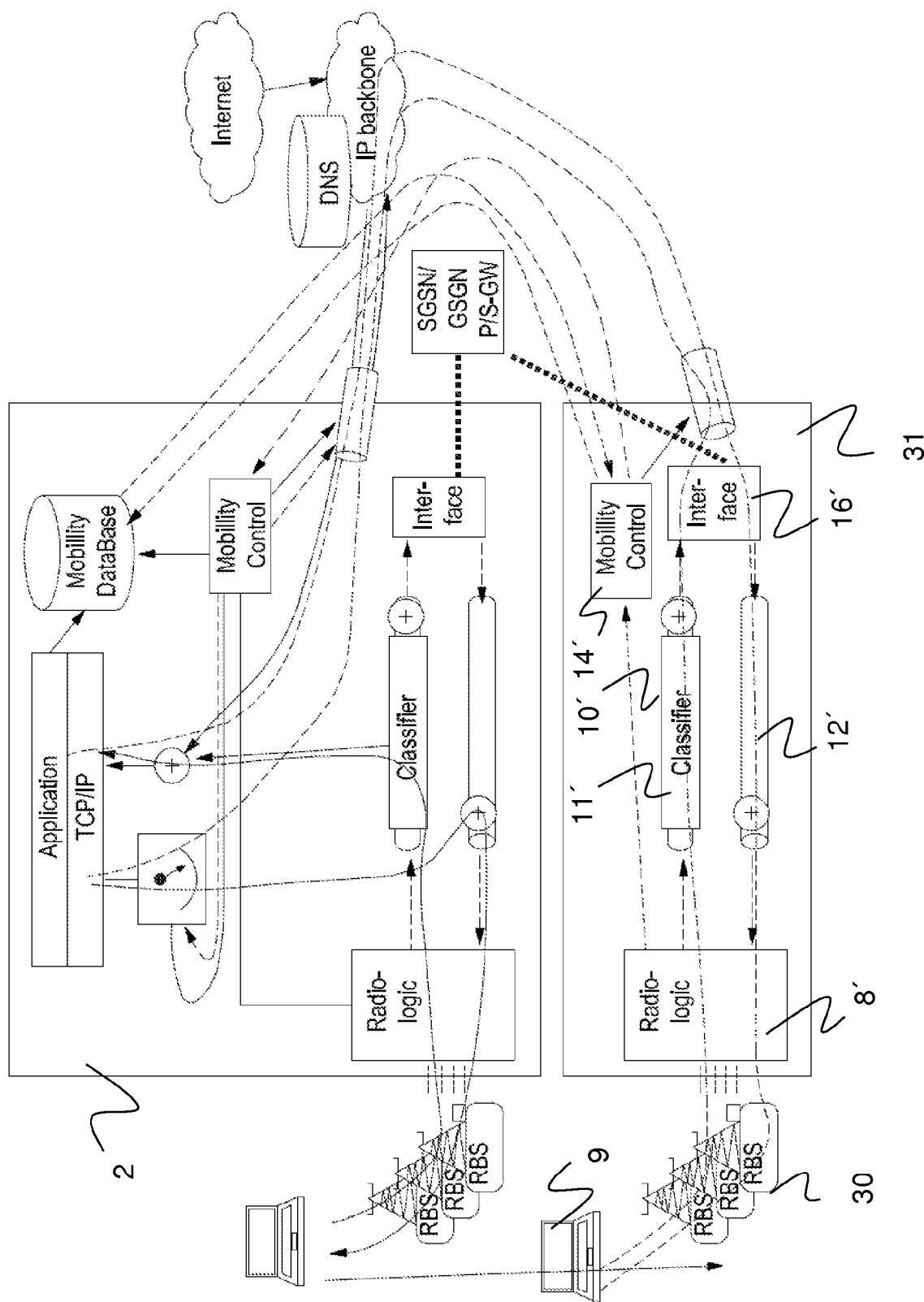
FIG. 3 illustrates a handover procedure within the architecture of FIG. 2.

This situation is illustrated schematically in FIG. 3, where the second RBS is identified by reference numeral 30 and the second or "target" RNC is identified by reference numeral 31. Components of the target RNC 31 common to the first RNC 2 are identified with like reference numerals, differentiated by a prime, i.e. "'". The known radio layer handover procedures are invoked and the UE 9 detaches from the first, source RNC 2 and attaches to the second, target RNC 31. During this handover process, the radio logic 8 in the source RNC 2 is made aware of the handover and accordingly notifies the local mobility control entity 14. In the target RNC, the local radio logic 8' informs the local mobility control entity 14' of the handover, and provides to it the client IP address as well as the identity of the source RNC 2.

The local mobility control entity 14' then uses the identity of the source RNC 2 to contact the mobility control entity 14 within that RNC 2. [The source and target RNC may communicate using one of the already standardised interfaces, for example the Iu or Iur interface.] In particular, the mobility control entity 14' in the target RNC 31 sends to the mobility control entity 14 in the source RNC, the client IP address and port number of the handed-over UE 9. The mobility control entity 14 within the source RNC 2 uses these client identifiers to look up the local mobility database 15 and obtain the associated mapping information, namely [Application_dest_IP, application_port, application_protocol, Receiver_Tunnel_IP, Receiver_tunnel_Port, Reciever_tunnel protocol]. This mapping information (which may include multiple mappings if the client is engaged in multiple sessions with different applications 19 within the local service network 17 of the source RNC 2) is returned to the local mobility control entity 14' within the target RNC 31, which then establishes an IP tunnel between the local interface 16' and the local service network 17 of the source RNC 2. The endpoint of the tunnel in the source RNC 2 is defined by [Receiver_Tunnel_IP, Receiver_tunnel_Port, Receiver_tunnel_protocol] whilst the endpoint within the target RNC is defined by a destination IP address and port number of the target RNC 31 [dest_tunnel_IP, dest_tunnel_port, dest_tunnel_protocol]. A tunnelling protocol such as Layer 2 Tunnelling Protocol may be used to establish the tunnel, although alternative protocols and procedures will be readily apparent to the skilled person.

Following establishment of the tunnel, the mobility control entity 14 within the source RNC 2 instructs the packet route selector 13 to switch so as to route traffic through the tunnel. These packets have as destination address and port number in the outer (tunnelling) header [dest_tunnel_IP, dest_tunnel_port,dest_tunnel_protocol], whilst the destination address and port number in the inner or encapsulated header is [client_IP, client_port, client_protocol]. In order to correctly handle uplink traffic in the target RNC 31, IP packet classifier 11' within the uplink packet handler 10' is configured to route traffic with [client_IP, client_port, client_protocol] as source and [application_dest_IP, application_dest_port, application_dest_protocol] as destination, through the established tunnel. If more than one mapping is provided to the target RNC 31 at handover, the uplink IP packet classifier 11' is configured with multiple five tuple vectors, i.e. {Application_dest_IP, Application_dest_port, Application_dest_protocol}.

The data traffic flow path following handover of the client from the source to the target RNC is of course much longer than the previous local path, traversing as it does two, rather than just one, RNCs. However, the new path is not significantly less efficient than the prior art routing path where the local data source is located above the GGSN, e.g. within the Internet or IP backbone. Moreover, as inter-RNC handovers are relatively infrequent, a local routing path will be used for the vast majority of service accesses.

Figure 4:
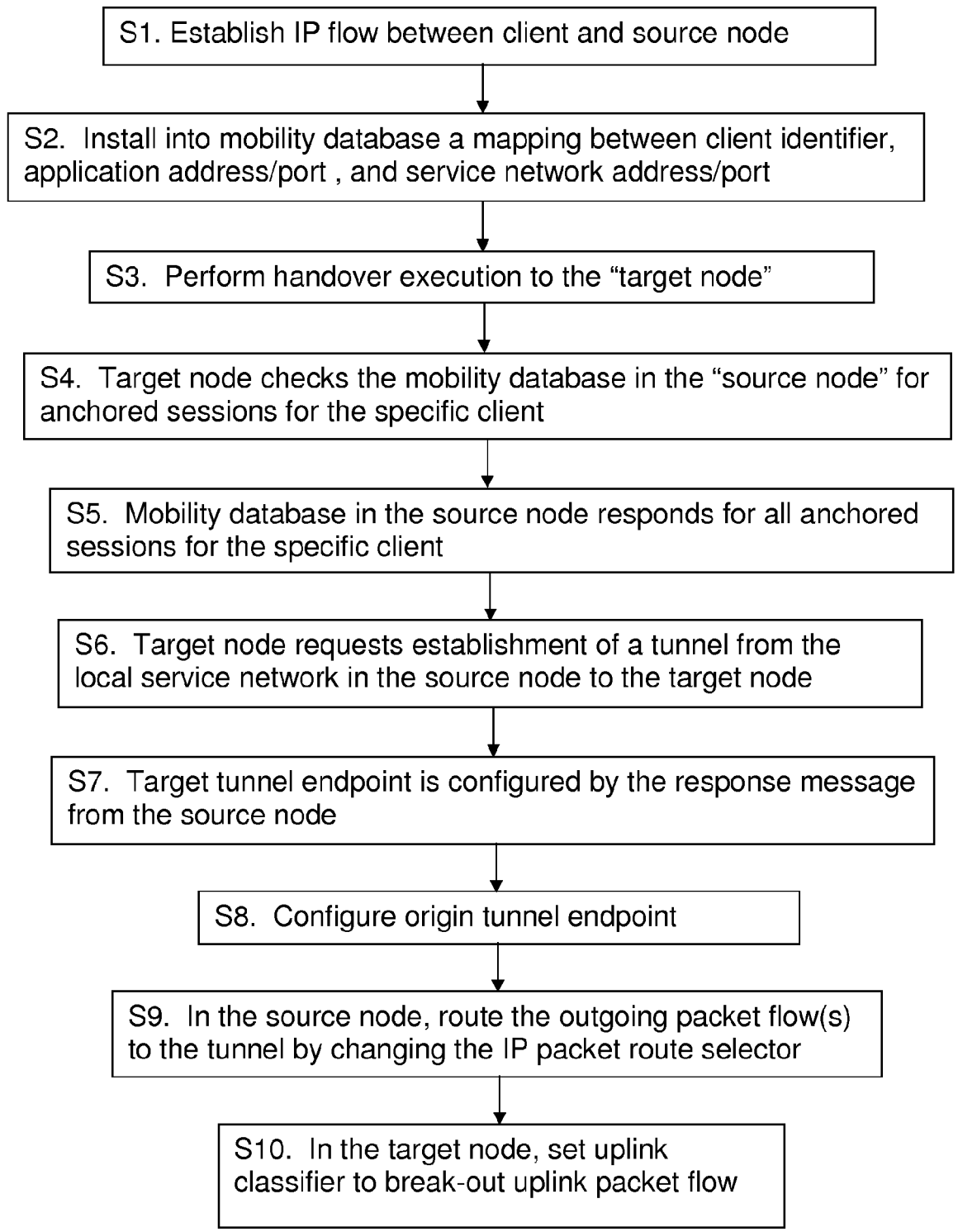
FIG. 4 is a flow diagram further illustrating the procedure of FIG. 3.

FIG. 4 is a flow diagram identifying various steps in this procedure. These steps are as follows:
1) An IP flow is established between the client and the source node, for example as a result of the client making a request for a streaming media session.
2) The client identity, and the IP address and port numbers of the application and local service network are installed into the mobility database.
3) A handover execution is performed to the "target node". A message is sent from the radio-logic in the target node: handover execution.
4) The target node checks the mobility database in the "source node" for anchored sessions for the specific client: Get_anchor(client_IP,client_port, client_protocol).
5) The mobility database in the source node responds for all anchored sessions for the specific client: Get_anchor_response,
(Application_dest_IP,application_dest_port, application_dest_protocol, Receiver_Tunnel_IP, Receiver_tunnel_Port, Receiver_tunnel_protocol).
6) The target node requests establishment of a tunnel from the local service network in the source node to the target node: Establish_tunnel(dest_tunnel_IP, dest_tunnel_port, dest_tunnel_protocol).
7) The target tunnel endpoint is configured by the message: Set_tunnel(Receiver_Tunnel_IP, Receiver_tunnel_Port, Receiver_tunnel_protocol).
8) The origin tunnel endpoint is configured by: Set_tunnel(dest_tunnel_IP,Dest_tunnel_port, Dest_tunnel_protocol)
9) In the source node, route the outgoing packet flow(s) to the tunnel by changing the IP packet route selector. Switch to tunnel ( . . . ).
10) In the target node, set uplink classifier to break-out: Set_classification(uplink_destination_IP-address, uplink_dest_Port, uplink_dest_protocol)

It should be noted that the mobility database need not be located within the RNC, but may be located outside of the RNC. Indeed, a single, centralised mobility database may be provided within the radio access network, shared by all or a subset of RNCs within the radio access network.

Figure 5:
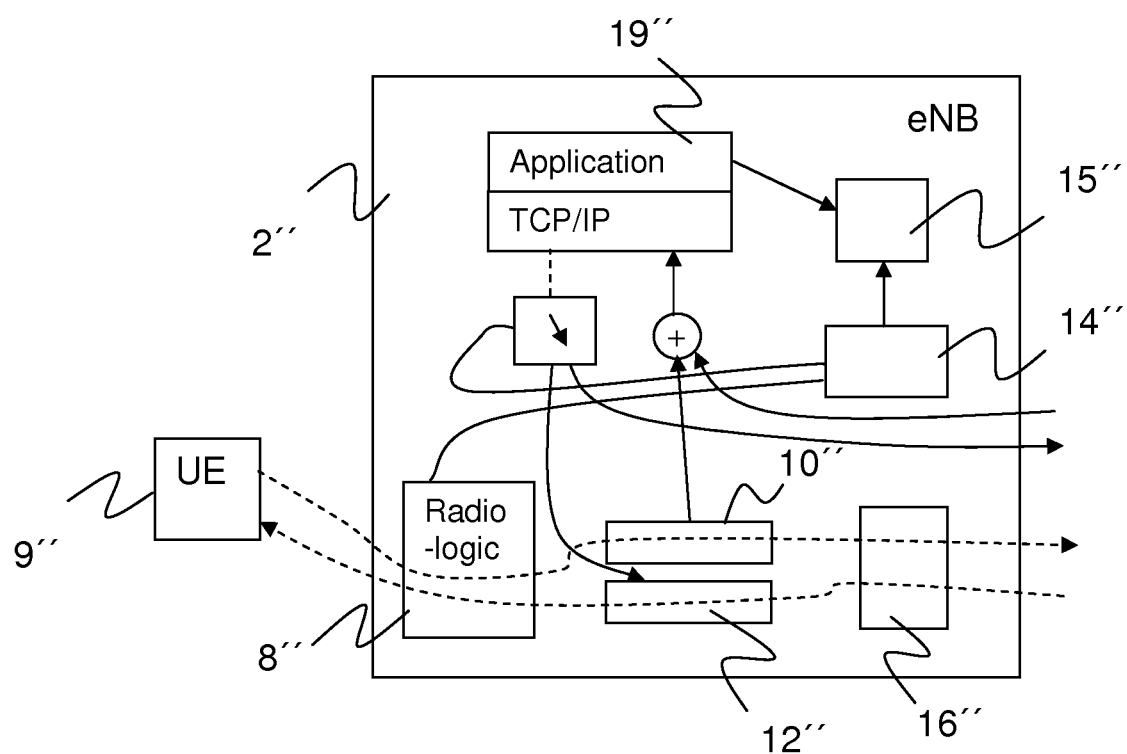
FIG. 5 illustrates schematically an eNodeB architecture for implementing IP flow switching at handover within a LTE network.

Considering now the implementation of this approach in the SAE/LTE (4G) architecture, 3GPP TS 36.300 ["Evolved Universal Terrestrial Radio Access (E-UTRA) and Evolved Universal Terrestrial Radio Access Network (E-UTRAN)"] describes how the radio layer handover procedure is performed without involvement of the Evolved Packet Core (EPC) network. As such, messages sent to set up the handover are exchanged directly between the radio network control entities, i.e. the eNBs. The release of the resources at the source side during the handover completion phase is triggered by the eNB. FIG. 5 illustrates schematically a possible eNB architecture, which includes functional components described above with reference to the 3G architecture. Components in FIG. 5 are identified with reference numerals corresponding to those used in FIG. 2, but denoted with a "'''". The skilled person will readily understand how the components must be modified to work in a 4G architecture as compared to a 3G architecture.

Figure 6:
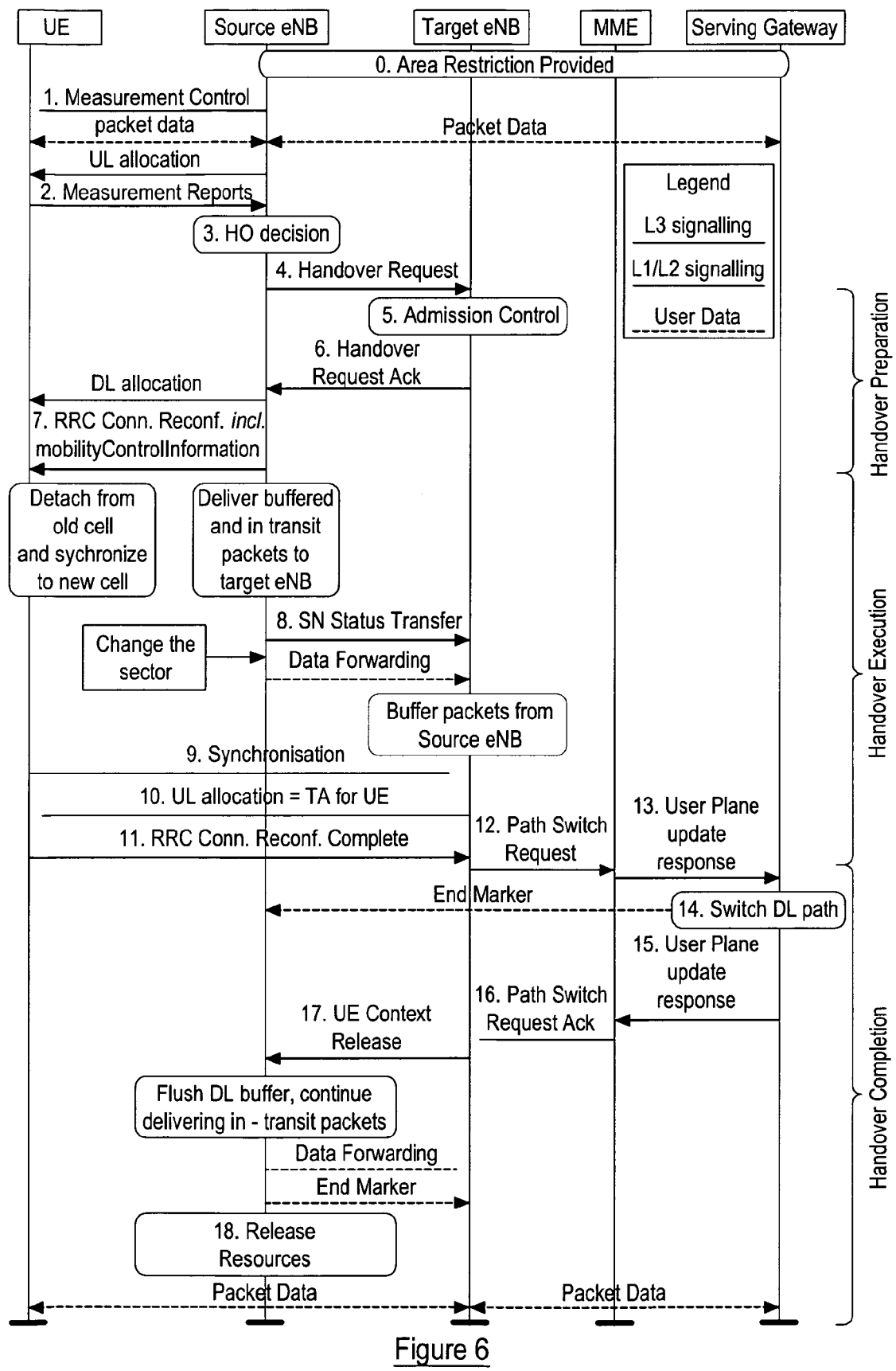
FIG. 6 illustrates signalling associated with the procedure for implementing IP flow switching at handover within a LTE network.

FIG. 6 depicts the basic handover scenario where neither Mobility Management Entity (MME) nor Serving Gateway changes. The illustrated scenario assumes that the local service network forms part of the eNB. The "source" eNB is considered to be the old eNB from which the client (UE) is being handed over, whilst the "target" eNB is the new eNB to which the client is being handed over.

The steps depicted in FIG. 6 are described in more detail as follows:

0. The UE context within the source eNB contains information regarding roaming restrictions which were provided either at connection establishment or at the last Tracking Area (TA) update.
1. The source eNB configures the UE measurement procedures according to the area restriction information. Measurements provided by the source eNB may assist the function controlling the UE's connection mobility.

At this point, the user is attached to the EPC network and user packet data flows between the UE and the EPC.

2. The UE is triggered to send a MEASUREMENT REPORT by the rules set by system information, specification etc.
3. The source eNB makes a decision based on the MEASUREMENT REPORT and RRM information to hand off the UE.
4. The source eNB issues a HANDOVER REQUEST message to the target eNB, passing information necessary to prepare for the handover at the target side.
5. Admission Control may be performed by the target eNB.
6. The target eNB prepares for handover and sends the HANDOVER REQUEST ACKNOWLEDGE to the source eNB. As soon as the source eNB receives the HANDOVER REQUEST ACKNOWLEDGE, or as soon as the transmission of the handover command is initiated in the downlink, data forwarding may be initiated over the inter-eNB X2 interface. [As this data forwarding mechanism exists only for the duration of the handover process, it is not suitable for long term data forwarding, e.g. of streaming media.]
7. The source eNB generates the RRC message to perform the handover, i.e RRCConnectionReconfiguration message including the mobilityControlInformation towards the UE. The UE receives the RRCConnectionReconfiguration message and is commanded by the source eNB to perform the handover.
8. The source eNB sends the SN STATUS TRANSFER message to the target eNB to convey the uplink PDCP SN receiver status and the downlink PDCP SN transmitter status of E-RABs for which PDCP status preservation applies (i.e. for RLC AM).

At this stage, inter-eNB signalling is exchanged to establish a tunnel between the target eNB and the local service network of the source eNB. The mobility control entity within the source eNB instructs the IP packet route selector within that eNB to switch downlink packet flows for the handed-over UE to the tunnel. This traffic flow is not illustrated in FIG. 5. At the same time, the mobility control entity within the target eNB configures the uplink classifier within that eNB with the appropriate vectors in order to route the appropriate traffic flows (from the UE to the in-use application(s) within the local service network of the source eNB) through the established tunnel.

Steps 9 to 16 provide means to avoid data loss during handover and are further detailed in 10.1.2.1.2 and 10.1.2.3 of 3GPP TS 36.300.

Steps 17 and 18 result in the downlink buffer in the source eNB being flushed, following which downlink resources allocated to the UE in the source eNB are released.

Figure 7:
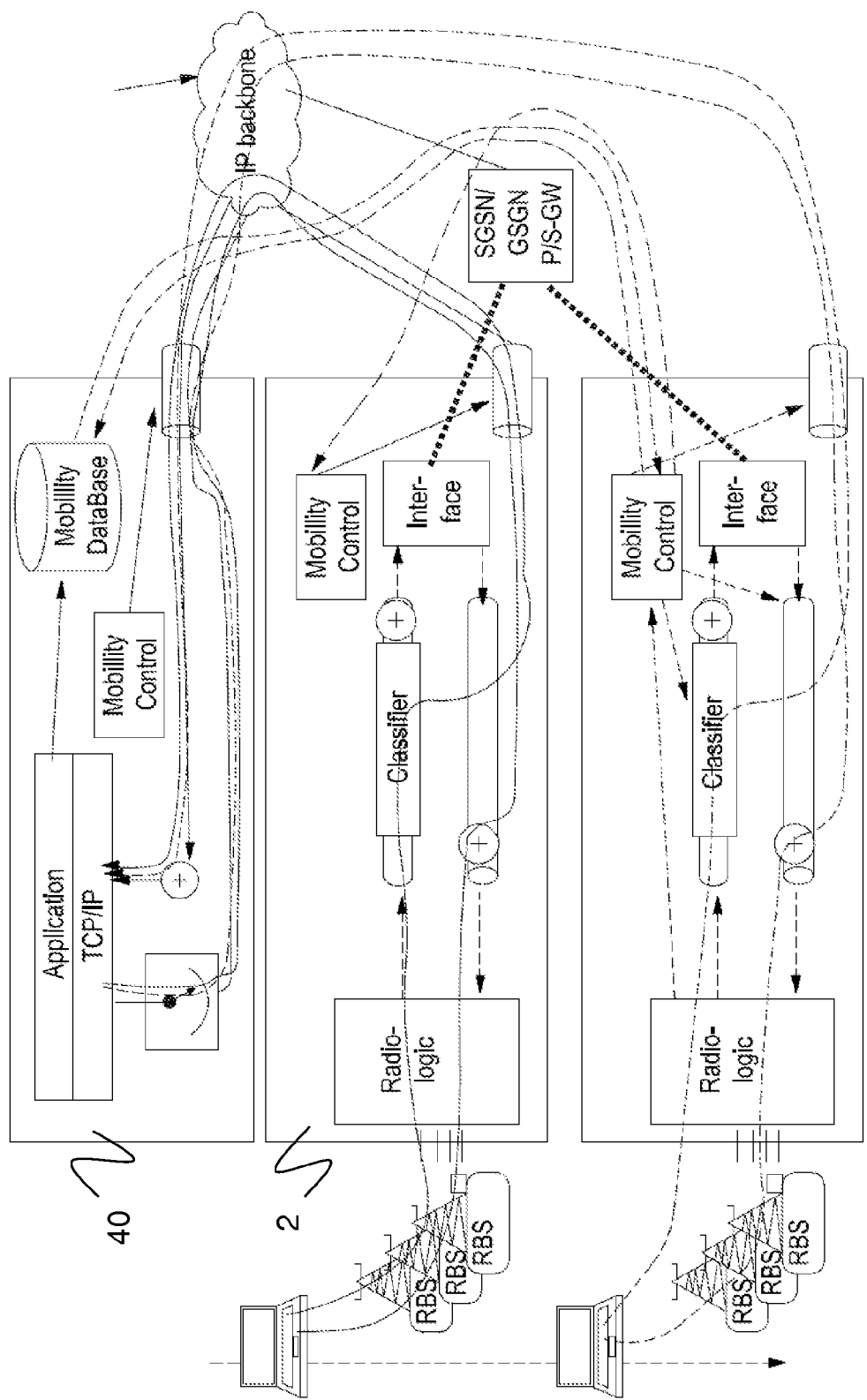
FIG. 7 illustrates schematically a scenario within a 3G network involving a handover of a UE from a second to a third RNC, where the local service network serving an IP flow is located in a first RNC.

FIG. 7 illustrates schematically an alternative scenario in which the local service network including the application(s) is located within a node 40 that is separate from the source RNC 2. Such a scenario arises, for example, when a UE is being handed over for a second time. The sequence of steps 1) to 10) described above with reference to FIG. 4 applies in this case, with the difference that at step 9) there is no need to switch the selector in the node 40.

Figure 8:
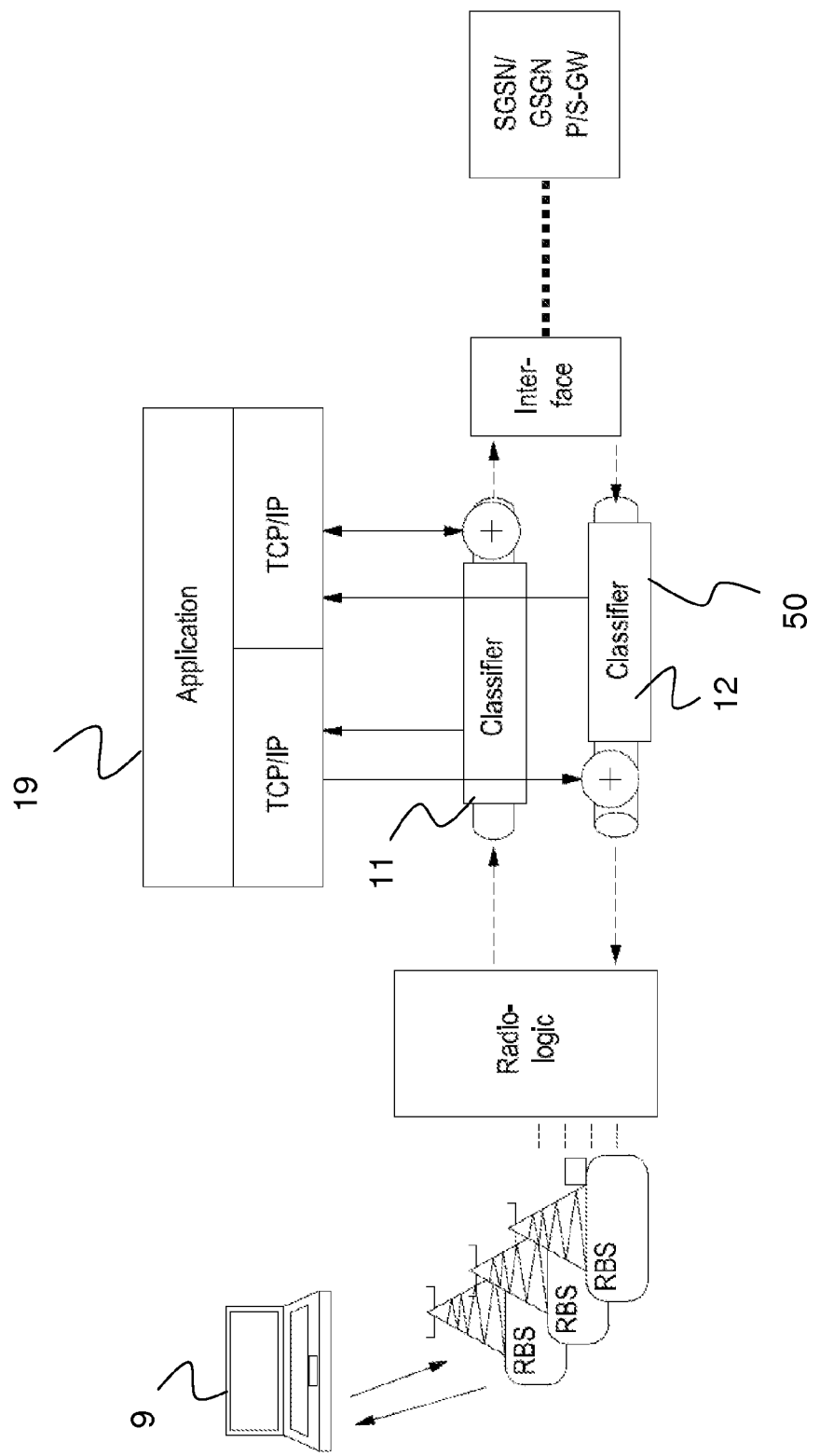
FIG. 8 illustrates schematically an RNC architecture within a 3G network, where the service network operates as an IP middlebox.

In the architectures considered above, the application (e.g. application 19 in FIG. 2) in the local service network that is serving the client, acts only as an end point and source point for IP traffic. Therefore, the application is provided with only a single TCP/IP layer. The uplink packet handler 10 and associated classifier 11 are responsible for routing traffic to the application 19 from the UE 9 based upon destination IP address. In an alternative scenario, the application operates as a middlebox, with all traffic between the Internet and the UE being routed via the application. This scenario is illustrated in FIG. 8. In this case, the classifier 11 in the uplink direction is configured to divert all uplink traffic directed to a given well known port, typically port number 80 for http traffic, to the application 19. The application 19 handles traffic addressed to the local service network based upon the destination IP address (and request URL). Other traffic is routed back to the uplink packet handler 10 for forwarding to the Internet. An additional classifier 50 is provided within the downlink packet handler 12 and similarly diverts downlink traffic to the application 19 based upon destination port number. The application 19 caches traffic if necessary before returning the traffic to the downlink packet handler 12 for forwarding to the UE 9.

Figure 9:
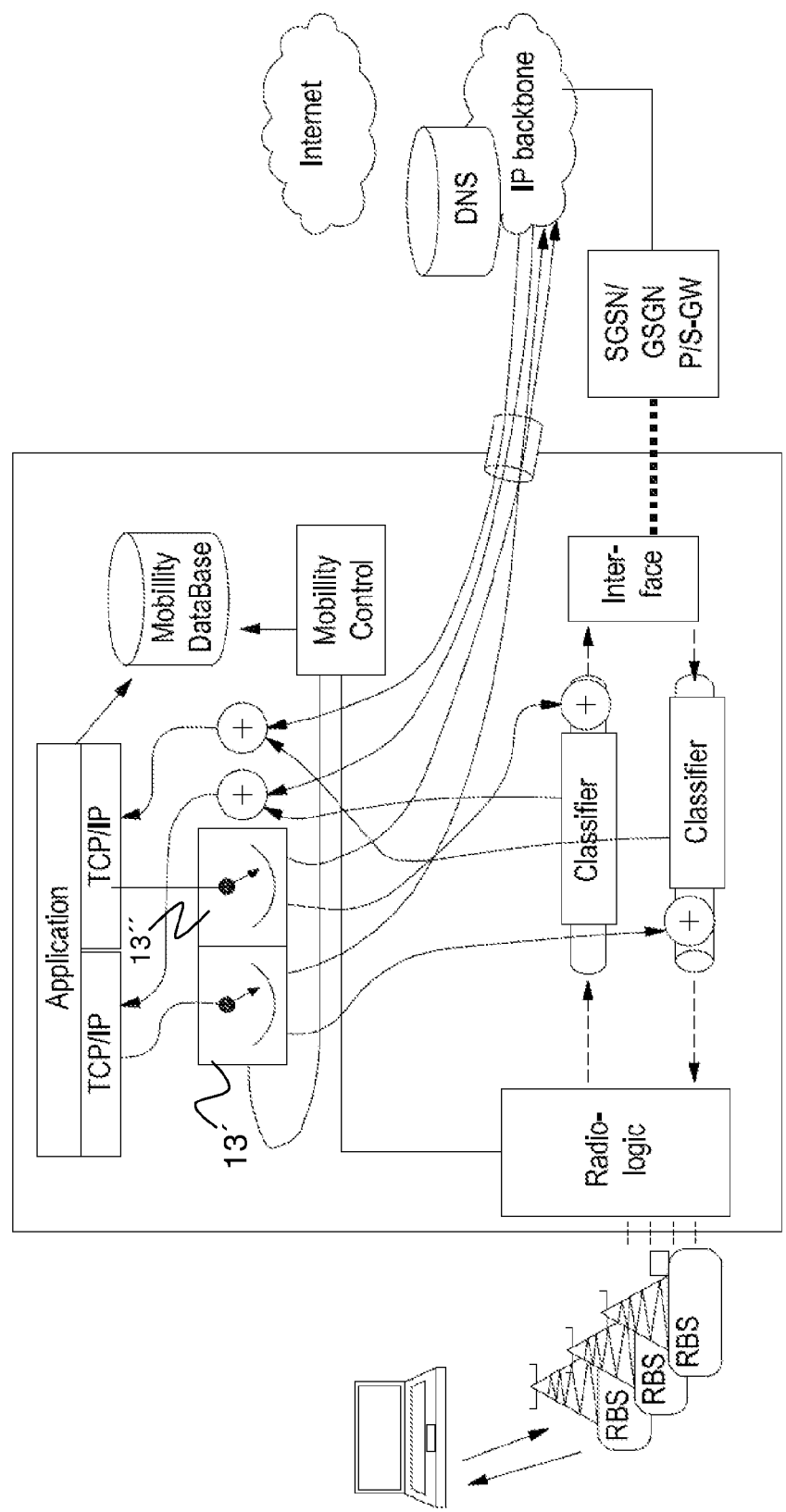
FIG. 9 illustrates an IP flow switching function integrated into the RNC architecture of FIG. 8.

It will be readily appreciated (with reference to FIG. 8) that two TCP/IP layers are provided beneath the application 19. A first of these TCP/IP layers provides an interface towards the UE 9 whilst the other provides an interface towards the Internet. In order to enable client mobility as outlined above, the radio layer node (e.g. RNC) is configured as illustrated in FIG. 9. A pair of selectors 13',13" are provided, a first of which selectors 13' functions in the same way as the selector 13 described above. In particular, in a first position a), the selector 13' is set to route downlink traffic onto the downlink RAB, whilst in a second position b) it is set to route that downlink traffic into the established tunnel. A second of the selectors 13" is configured in a first position a) to route traffic on the uplink radio link onto the uplink packet bearer for the UE and in a second position b) to route that traffic to the IP backbone via the established tunnel. This arrangement requires that, for both TCP/IP stacks, switching of the associated IP packet route selectors 13', 13" is synchronized such that, prior to a handover, both switches are in position a) and following handover both switches are in position b).

Following handover, the classifiers are set to the same values in the target node as in the source node. The sequence to perform handover is as before. The sequence for handover from initial node is shown below with certain required additions.

1) A handover execution is performed to the "target node". A message is sent from the radio-logic in the target node: handover execution.
2) The target node checks the mobility database in the "source node" for anchored sessions for the specific client: Get_anchor(client_IP,client_port, client_protocol)
3) The mobility database in the source node responds for all anchored session for the specific client:
Get_anchor_response(Application_dest_IP,application_dest_port, Application_dest_protocol, Receiver_Tunnel_IP, Receiver_tunnel_Port, Receiver_tunnel_protocol . . . )

4) The target node requests establishment of a tunnel from the application(s) to the target node: Establish_tunnel (dest_tunnel_IP, dest_tunnel_port, dest_tunnel_protocol)
5) The target tunnel endpoint is configured by message: Set_tunnel(Receiver_Tunnel_IP, Receiver_tunnel_Port, Receiver_tunnel_protocol)
6) The origin tunnel endpoint is configured by: Set_tunnel(dest_tunnel_IP,Dest_tunnel_port, Dest_tunnel_protocol)
7) At the source node, route the outgoing packets to the tunnel by changing the position of the selector switches [from a) to b)]. Switch to tunnel ( . . . )
8) Set classifiers in the target node to break-out: Set_classification(uplink_destination_IP-adress, uplink_dest_Port, uplink_dest_protocol, downlink_destination_IP-adress, Downlink_dest_Port, downlink_dest_protocol))

It will be appreciated by the person of skill in the art that various modifications may be made to the above described embodiments without departing from the scope of the present invention. For example, in the embodiments described above, the application within the local service network is responsible for registering the anchoring (that is mapping) information for a client into the local mobility database. An alternative approach is to trigger the registration of the anchoring information using the TCP-flow set-up message: TCP-syn. This means that anchoring can be done without involving knowledge about the higher layers in the application. It can even be done by the uplink classifier, with the classifier sending a registration message to the mobility database.

Figure 10:
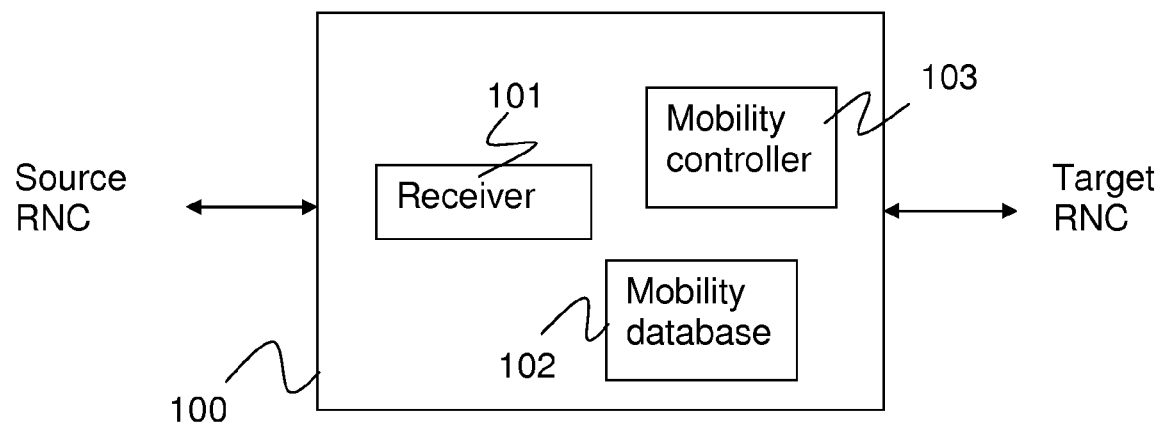
FIG. 10 illustrates schematically a node implementing a centralised mobility database.

As has been mentioned above, the mobility database may be located at a central node, accessible to multiple radio layer nodes (e.g. RNCs) within the network. In such an architecture, a separate mobility controller is implemented within the central database, and supplies the mapping data, on request, to the target RNC. The mobility database may also instruct the source RNC to route IP traffic through the tunnel, or a request may subsequently be sent from the target RNC to the source RNC. A generic node architecture 100 is illustrated in FIG. 10 and comprises a receiver 101 for receiving mapping data from a source RNC following the establishment of an IP flow, at the source RNC, to a client. The received mapping data is then stored within a mobility database 102, together with other previously received mappings. A mobility controller 103 receives and responds to queries from target RNCs, supplying mapping data extracted from the mobility database.

The invention claimed is:

1. A method of providing for the transfer of an IP flow when a client is handed over from a first to a second radio layer node of a cellular communications network, the method comprising:

establishing said IP flow between a client and an application of a local service network within or connected to said first radio layer node, and sending said IP flow over a radio access bearer extending between the client and the first radio layer node;

maintaining within a mobility database a mapping between an identifier of the client, an application IP address associated with the in-use data source for said application, and a local service network IP address, said local service network IP address being a unique IP address that allows the local service network providing the application to be reached externally;

prior to or upon handover of the client from said first radio layer node to the second radio layer node, sending a request including the client identifier from said second to said first radio layer node or to another node if the central mobility database is maintained in that other node, using the client identifier contained in said request at said first radio layer node or said other node to identify said mapping in the mobility database, and sending from said first radio layer node or said other node, to said second radio layer node, the application and local service network IP addresses;

receiving the application and local service network IP addresses at said second radio layer node, and using the received local service network IP address at said second radio layer node to establish a tunnel between the second radio layer node and said local service network; and switching said IP flow from said radio access bearer to said tunnel for delivery to the client via said second radio layer node.

2. A method according to claim 1 and comprising including within said mapping port numbers of said application and said local service network, and sending this further information to said second radio layer node together with said IP addresses.

3. A method according to claim 1, wherein said cellular communications network comprises one of a UMTS Terrestrial Radio Access Network (UTRAN) and a Long Term Evolution Radio Access Network and, in the former case said first and second radio layer nodes are Radio Network Controllers and in the latter case said first and second radio layer nodes are eNBs.

4. A method according to claim 3 and comprising sending said request from said second to said first radio layer node over the Iu or Iur interface.

5. A method according to claim 1 and comprising, following the establishment of said IP flow, detecting packets associated with said IP flow in an uplink radio access bearer at said first radio layer node, and diverting those packets to said application.

6. A method according to claim 1, wherein said client identifier is a client IP address and, optionally, a client port number.

7. A method according to claim 1, wherein said step of sending a request including the client identifier from said second to said first radio layer node is carried out following a handover of the radio link from the first to the second radio layer node.

8. A method according to claim 7, wherein said step of switching said IP flow from said radio access bearer to said tunnel for delivery to the client via said second radio layer node is triggered by a signal from radio logic within the first radio layer node confirming a handover of the radio link.

9. A method according to claim 7, wherein said step of sending a request including the client identifier from said second to said first radio layer node is triggered by radio logic within the second radio layer node determining that a handover of the radio link has been completed or is being carried out.

10. A method according to claim 1, wherein said step of sending a request including the client identifier from said second to said first radio layer node is carried out prior to a handover of the radio link from the first to the second radio layer node, but after a decision to perform that handover has been made.

11. A method according to claim 1, wherein said tunnel endpoints are defined by at least said IP address of said local service network, and an IP address of the second radio layer node.

12. A method according to claim 1, wherein said mobility database is either a local database within the first radio layer node, or a central database that is centrally accessible to multiple radio layer nodes including said first and second radio layer nodes.

13. A method according to claim 1 and comprising, following handover of the radio link, identifying packets in the uplink radio access bearer at the second radio layer node associated with said IP flow based upon the received application IP address and optionally port number, and routing the identified packets to said local service network through said tunnel.

14. A method according to claim 1 and comprising switching one or more further IP flows terminating at said client, from said radio access bearer to said tunnel for delivery to the client via said second radio layer node, each further IP flow originating at a network layer above said first radio layer node.

15. Apparatus configured to operate as a radio layer node within a cellular communications network, the apparatus comprising:
- an IP flow controller configured to control an IP flow between a client and an application of a local service network within or connected to the apparatus, and to send said IP flow over a radio access bearer extending between the client and the first radio layer node;
- a database controller configured to maintain, within a mobility database, a mapping between an identifier of the client, an application IP address associated with the in-use data source for said application, and a local service network IP address of said local service network, said local service network IP address being a unique IP address that allows the local service network providing the application to be reached externally;
- a mobility controller configured, prior to or upon handover of the client from the apparatus to a second radio layer node, to receive a request including the client identifier from said second radio layer node, to use the client identifier contained in said request to identify said mapping in the mobility database, and to send to said second radio layer node the application and local service network IP addresses;
- a tunnel configurator configured to configure an IP tunnel towards said second radio layer node; and
- a switch configured to switch said IP flow from said radio access bearer to said tunnel for delivery to the client via said second radio layer node.

16. Apparatus according to claim 15, the apparatus comprising said mobility database.

17. Apparatus according to claim 15, the apparatus being configured to operate as a Radio Network Controller within a UMTS Terrestrial Radio Access Network (UTRAN) or as an enhanced Node B within a Long Term Evolution Radio Access Network.

18. Apparatus according to claim 15, the apparatus being configured to operate as a middlebox, routing an IP flow traversing an IP core network of said cellular communication network to an application of said local service network, and comprising a further switch configured to switch said further IP flow from said radio access bearer to said tunnel for delivery to the client via said second radio layer node.

19. Apparatus according to claim 18, said database controller being configured to maintain within said mobility database an identifier of the client, an IP address of said application to which said IP flow traversing the IP core network is routed, an IP address of said local service network, and said mobility controller being configured to also provide this further mapping to said second radio layer node prior to or upon handover.

20. Apparatus according to claim 15, wherein said database controller is configured to include within said mapping(s), port numbers of said application and said local service network, and wherein said mobility controller is configured to send this further information to said second radio layer node together with said IP addresses.

21. Apparatus configured to operate within a cellular communications network, the apparatus comprising:
- a receiver configured to receive from a first radio layer node a mapping between an identifier of a client associated with the radio layer node, an application IP address associated with the in-use data source for an application delivering an IP flow to said client, and a local service network IP address of a local service network, said local service network IP address being a unique IP address that allows the local service network providing the application to be reached externally;
- a mobility database configured to record the received mapping; and
- a mobility controller configured, prior to or upon handover of the client from said first radio layer node to a second radio layer node, to receive a request including the client identifier from said second radio layer node, to use the client identifier contained in said request to identify said mapping in the mobility database, and to send to said second radio layer node the application and local service network IP addresses.

* * * * *